United States Patent
Genord

(10) Patent No.: US 9,974,242 B1
(45) Date of Patent: May 22, 2018

(54) CLIPPINGS-COLLECTING NET FOR BUSH-TRIMMING SHEARS

(71) Applicant: Daniel Genord, Milford, MI (US)

(72) Inventor: Daniel Genord, Milford, MI (US)

( * ) Notice: Subject to any disclaimer, the term of this patent is extended or adjusted under 35 U.S.C. 154(b) by 0 days. days.

(21) Appl. No.: 15/444,402

(22) Filed: Feb. 28, 2017

(51) Int. Cl.
  *B26B 13/22* (2006.01)
  *A01D 46/22* (2006.01)
  *A01G 3/047* (2006.01)

(52) U.S. Cl.
  CPC ........... *A01G 3/0475* (2013.01); *A01D 46/22* (2013.01); *B26B 13/22* (2013.01)

(58) Field of Classification Search
  CPC ............ A01G 3/0475; A01G 2003/023; Y10T 83/222; B26B 13/22; A01D 46/22
  USPC ..................................... 30/124, 131
  See application file for complete search history.

(56) References Cited

U.S. PATENT DOCUMENTS

| | | | | |
|---|---|---|---|---|
| 1,151,874 A | * | 8/1915 | Harris | B23D 17/00 30/134 |
| 1,171,324 A | * | 2/1916 | Darr | A01D 46/28 30/131 |
| 2,086,081 A | * | 7/1937 | Hollenbeck | A01G 3/02 30/134 |
| 2,281,189 A | * | 4/1942 | Wright | A01G 3/053 30/132 |
| 2,337,285 A | * | 12/1943 | Widdowson | A01G 3/0475 294/50.8 |
| 2,415,648 A | * | 2/1947 | Marvin | A01D 46/247 56/335 |
| 3,212,186 A | | 10/1965 | Frauenheim, Sr. | |
| 3,795,050 A | | 3/1974 | Latsha | |
| 4,071,951 A | * | 2/1978 | Burns | A01G 3/053 30/132 |
| 4,464,837 A | | 8/1984 | Amstutz | |
| D313,334 S | | 1/1991 | Novak | |
| 5,383,274 A | | 1/1995 | Miller | |
| 5,653,029 A | * | 8/1997 | Shigenaka | A01G 3/053 30/132 |
| 7,424,777 B2 | | 9/2008 | Namvar | |
| 2007/0157473 A1 | | 7/2007 | Varnell | |

FOREIGN PATENT DOCUMENTS

GB    323161 A    12/1929

* cited by examiner

*Primary Examiner* — Hwei C Payer
(74) *Attorney, Agent, or Firm* — Kyle A. Fletcher, Esq.

(57) ABSTRACT

The clippings-collecting net for bush-trimming shears is a handheld tool configured for use in agriculture and horticulture. The clippings-collecting net for bush-trimming shears is configured for use with a hedger. The clippings-collecting net for bush-trimming shears comprises a plurality of supports and a trap. The plurality of the supports and the trap are attached to the hedger. The supports and the trap capture clippings as they are produced by the hedger and contain the clippings within the trap until they can be appropriately disposed of.

12 Claims, 3 Drawing Sheets

CLIPPINGS-COLLECTING NET FOR BUSH-TRIMMING SHEARS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture including cutting implements for horticultural purposes, more specifically, a device for trimming bushes.

SUMMARY OF INVENTION

The clippings-collecting net for bush-trimming shears is a handheld tool configured for use in agriculture and horticulture. The clippings-collecting net for bush-trimming shears is configured for use with a hedger. The clippings-collecting net for bush-trimming shears comprises a plurality of supports and a trap. The plurality of the supports and the trap are attached to the hedger. The supports and the trap capture clippings as they are produced by the hedger and contain the clippings within the trap until they can be appropriately disposed of.

These together with additional objects, features and advantages of the clippings-collecting net for bush-trimming shears will be readily apparent to those of ordinary skill in the art upon reading the following detailed description of the presently preferred, but nonetheless illustrative, embodiments when taken in conjunction with the accompanying drawings.

In this respect, before explaining the current embodiments of the clippings-collecting net for bush-trimming shears in detail, it is to be understood that the clippings-collecting net for bush-trimming shears is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the clippings-collecting net for bush-trimming shears.

It is therefore important that the claims be regarded as including such equivalent construction insofar as they do not depart from the spirit and scope of the clippings-collecting net for bush-trimming shears. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
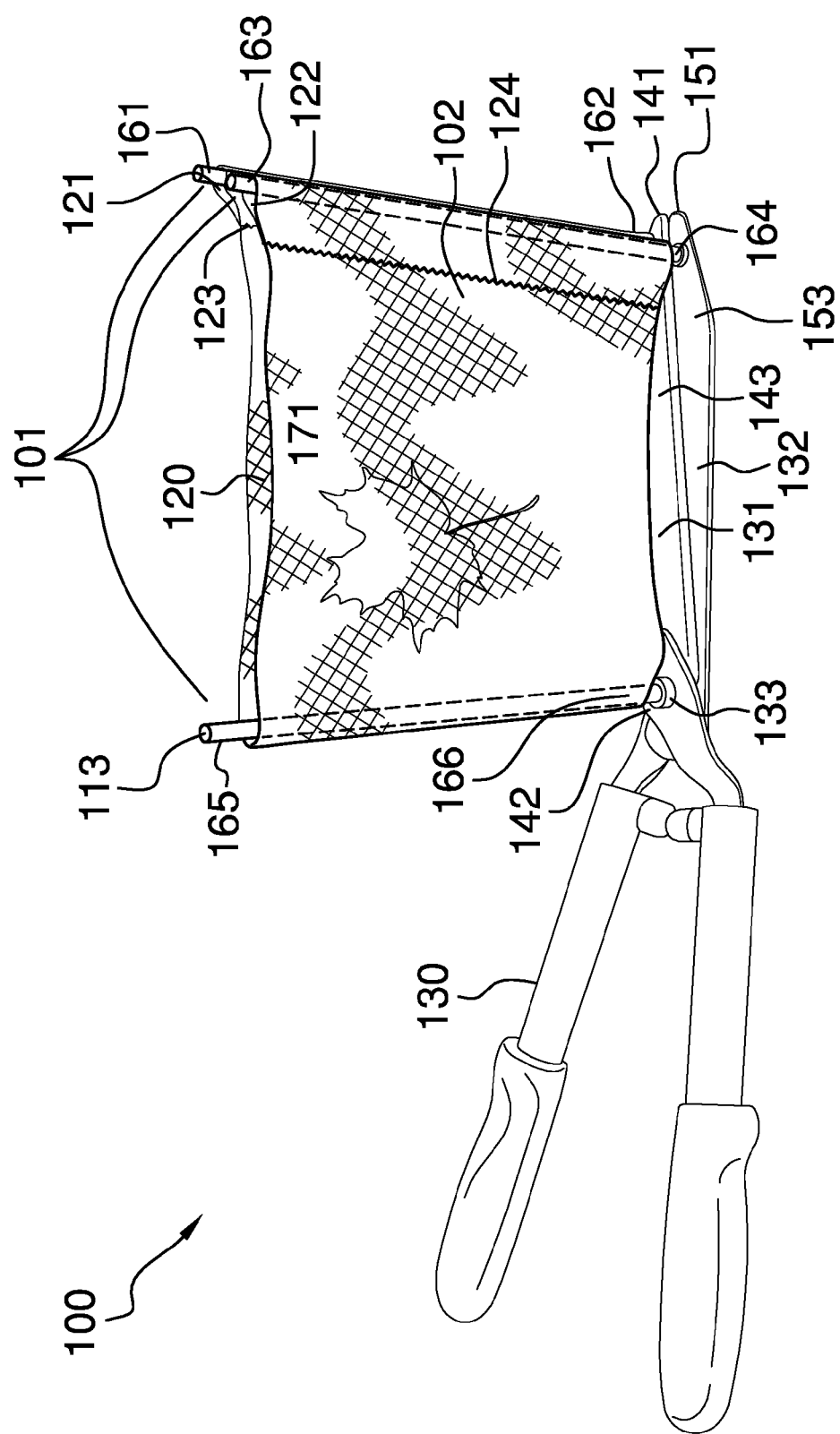
FIG. 1 is a perspective view of an embodiment of the disclosure.
Figure 2:
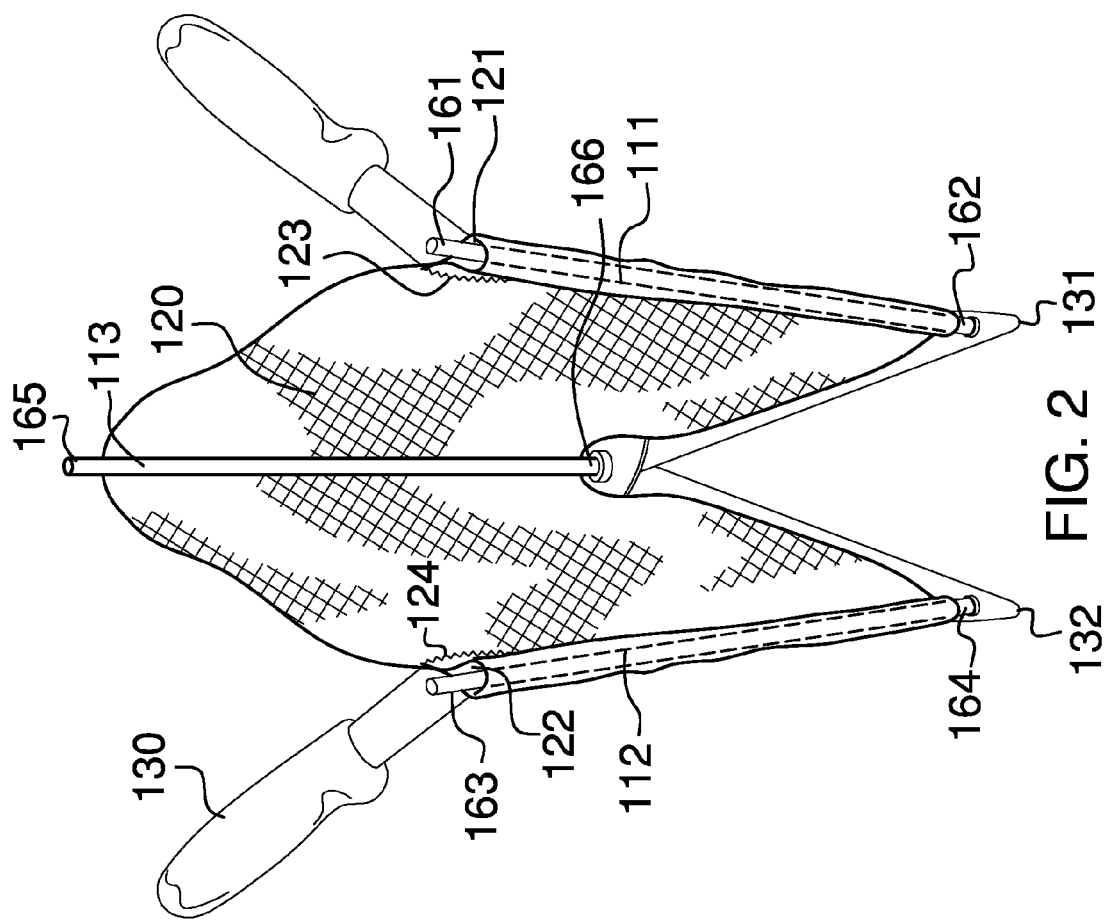
FIG. 2 is a front view of an embodiment of the disclosure.
Figure 3:
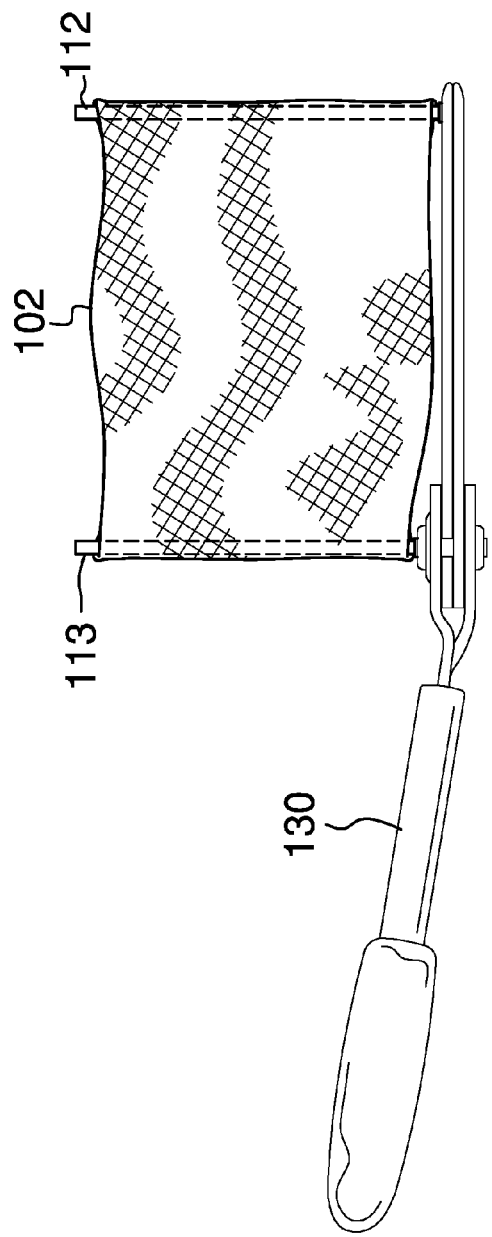
FIG. 3 is a side view of an embodiment of the disclosure.
Figure 4:
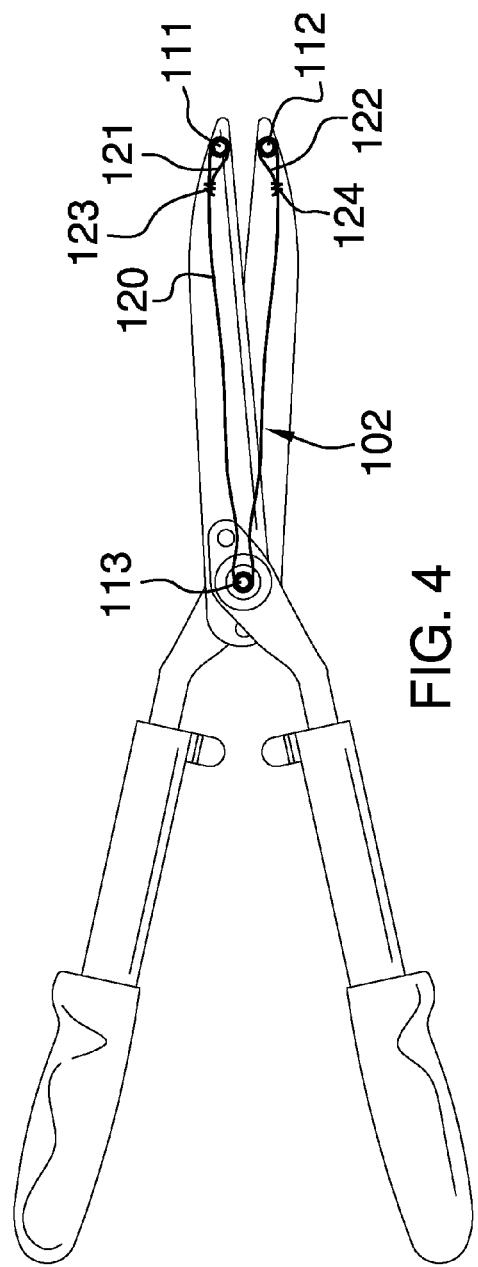
FIG. 4 is a top view of an embodiment of the disclosure.

Detailed reference will now be made to one or more potential embodiments of the disclosure, which are illustrated in FIGS. 1 through 4.

The clippings-collecting net for bush-trimming shears 100 (hereinafter invention) is a handheld tool configured for use in agriculture and horticulture. The invention 100 is configured for use with a hedger 130. The invention 100 comprises a plurality of supports 101 and a trap 102. The plurality of supports 101 and the trap 102 are attached to the hedger 130. The plurality of supports 101 and the trap 102 capture clippings 171 as they are produced by the hedger 130 and contain the clippings 171 within the trap 102 until they can be appropriately disposed of.

The hedger 130 is a well-known and commercially available tool commonly used to trim hedges and other shrubs and bushes. Within the context of this disclosure, it is assumed that a commercially available hedger 130 is modified by the addition of the plurality of supports 101 and the trap 102. Those skilled in the mechanical arts will recognize that the invention 100 could be directly manufactured without undue experimentation. The hedger 130 is further defined with a first blade 131, a second blade 132, and a pivot 133. The first blade 131 is further defined with a first free end 141, a first fixed end 142, and a first superior face 143. The second blade 132 is further defined with a second free end 151, a second fixed end 152, and a second superior face 153.

The first blade 131 refers to the first cutting edge of the hedger 130. The second blade 132 refers to the second cutting edge of the hedger 130. The pivot 133 refers to a commercially available hardware item that joins the first blade 131 to the second blade 132 such that the first blade 131 will rotate relative to the second blade 132 to form the cutting motion. The first free end 141 is the end of the first blade 131 that is distal from the first fixed end 142. The first fixed end 142 is the end of the first blade 131 that is attached to the pivot 133.

The first superior face 143 is the face of the first blade 131 that is distal from the ground during normal use of the invention 100. The second free end 151 is the end of the second blade 132 that is distal from the second fixed end 152. The second fixed end 152 is the end of the second blade 132 that is attached to the pivot 133. The second superior face 153 is the face of the second blade 132 that is distal from the ground during normal use of the invention 100.

Each of the plurality of supports 101 is a commercially available cylindrical shaft that projects away from a surface selected from the group consisting of the first superior face 143 of the first blade 131 of the hedger 130 or the second superior face 153 of the second blade 132 of the hedger 130. Each of the plurality of supports 101 is attached to the selected surface in the manner of a cantilever. The plurality of supports 101 comprises a first support 111, a second support 112, and a third support 113. The first support 111 is further defined with a first end 161 and a second end 162. The second support 112 is further defined with a third end 163 and a fourth end 164. The third support 113 is further defined with a fifth end 165 and a sixth end 166.

The first support 111 is a cylindrical shaft. The second end 162 of the first support 111 attaches to the first free end 141 of the first superior face 143 of the first blade 131 in the manner of a cantilever. The second support 112 is a cylindrical shaft. The fourth end 164 of the second support 112 attaches to the second free end 151 of the second superior face 153 of the second blade 132. The third support 113 is a cylindrical shaft. The sixth end 166 of the third support 113 attaches to the pivot 133 of the hedger 130 in the manner of a cantilever.

The first end 161 forms the free end of the cantilever formed by the first support 111. The second end 162 forms the fixed end of the cantilever formed by the first support 111. The third end 163 forms the free end of the cantilever formed by the second support 112. The fourth end 164 forms the fixed end of the cantilever formed by the second support 112. The fifth end 165 forms the free end of the cantilever formed by the third support 113. The sixth end 166 forms the fixed end of the cantilever formed by the third support 113.

The trap 102 is a flexible sheeting that is attached to the plurality of supports 101. The trap 102 is a commercially available fabric. The trap 102 is mounted on the first superior face 143 and the second superior face 153 of the hedger 130. By mounting the trap 102 in this manner, the trap 102 will capture and contain the clippings 171 from the side as the hedger 130 cuts through a plant. As shown most clearly in FIG. 3, the clippings 171 are further supported from the bottom by the first superior face 143 and the second superior face 153 such that the clippings 171 will not fall to the ground. The trap 102 comprises a sheeting 120, a first channel 121, and a second channel 122.

In the first potential embodiment of the disclosure, the sheeting 120 is a mesh fabric. The sheeting 120 is cut in a rectangular shape.

The first channel 121 is a tubular passage through which a first support 111 selected from the plurality of supports 101 is inserted. The first channel 121 is formed by folding a first edge of the sheeting 120 back upon the sheeting 120 to form a tube. The first channel 121 further comprises a first seam 123. The first seam 123 secures the first channel 121 to the sheeting 120. In the first potential embodiment of the disclosure, the first seam 123 is a sewn seam.

The second channel 122 further comprises a second seam 124. The second channel 122 is a tubular passage through which a second support 112 selected from the plurality of supports 101 is inserted. The second channel 122 is formed by folding a second edge of the sheeting 120 back upon the sheeting 120 to form a tube. The second edge is the edge of the sheeting 120 that is distal from the first channel 121. The second seam 124 secures the second channel 122 to the sheeting 120. In the first potential embodiment of the disclosure, the second seam 124 is a sewn seam.

The use of the invention 100 is described in this paragraph. The first support 111 inserts through the first channel 121. The second support 112 inserts through the second channel 122. The center of the sheeting 120 is wrapped around the third support 113 such that the third support 113 is between the center of the sheeting 120 and the free ends of the first blade 131 and the second blade 132. The hedger 130 is then used as a normal hedger. Clippings 171 collected within the trap 102 are transported to a disposal location. At the disposal location, the first blade 131 and the second blade 132 of the hedger 130 are separated to release the clippings 171 from the trap 102.

The following definitions were used in this disclosure:

Blade: As used in this disclosure, a blade is a term that is used to describe: 1) a wide and flat portion of a structure; or, 2) the cutting edge of a tool.

Channel: As used in this disclosure, a channel is a tubular passage through which an object or fluid is passed through.

Hedger: As used in this disclosure, a hedger is a hand held unpowered bladed tool that is used to trim hedges, bushes, and shrubs. Common synonyms include, but are not limited to, a hedge trimmer, a hedge shears or simply trimmers or shears. A hedger is further defined with a first blade and a second blade. The first blade and the second blade are attached to each other at a pivot that allows the position of the first blade to be rotated relative to the second blade.

Inferior: As used in this disclosure, the term inferior refers to a directional reference that is parallel to and in the same direction as the force of gravity.

Mesh: As used in this disclosure, the term mesh refers to an openwork fabric made from threads, yarns, cords, wires, or lines that are woven, knotted, or otherwise twisted or intertwined at regular intervals. Synonyms for mesh include net.

Pivot: As used in this disclosure, a pivot is a rod or shaft around which an object rotates or swings.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, an ultrasonically bonded seam, or a seam formed using an adhesive.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Sheeting: As used in this disclosure, sheeting is a material, such as a textile, a plastic, or a metal foil, in the form of a thin flexible layer or layers.

Superior: As used in this disclosure, the term superior refers to a directional reference that is parallel to and in the opposite direction of the force of gravity.

Textile: As used in this disclosure, a textile is a material that is woven, knitted, braided or felted. Synonyms in common usage for this definition include fabric and cloth.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A cutting implement comprising
    wherein the cutting implement comprises a plurality of supports and a trap;
    wherein the cutting implement is configured for use with a hedger;
    wherein the plurality of supports and the trap are attached to the hedger;
    wherein the cutting implement is a handheld tool;
    wherein it is configured for use in agriculture and horticulture;
    wherein the hedger is further defined with a first blade, a second blade, and a pivot;
    wherein the first blade is further defined with a first free end, a first fixed end, and a first superior face;
    wherein the second blade is further defined with a second free end, a second fixed end, and a second superior face;
    wherein the pivot attaches the first blade to the second blade such that the first blade will rotate relative to the second blade;
    wherein the first free end is the end of the first blade that is distal from the first fixed end;
    wherein the first fixed end is the end of the first blade that is attached to the pivot;
    wherein the second free end is the end of the second blade that is distal from the second fixed end;
    wherein the second fixed end is the end of the second blade that is attached to the pivot;
    wherein the first superior face is the face of the first blade that is distal from the ground during normal use of the cutting implement;
    wherein the second superior face is the face of the second blade that is distal from the ground during normal use of the cutting implement;
    wherein the plurality of supports and the trap capture clippings as they are produced by the hedger;
    wherein the plurality of supports and the trap capture and contain the clippings within the trap;
    wherein each of the plurality of supports is a cylindrical shaft;
    wherein each of the plurality of supports projects away from a surface selected from the group consisting of the first superior face of the first blade of the hedger or the second superior face of the second blade of the hedger;
    wherein each of the plurality of supports is attached to the selected surface in the manner of a cantilever;
    wherein the plurality of supports comprises a first support, a second support, and a third support;
    wherein the trap attaches to the first support, the second support, and the third support;
    wherein the first support is further defined with a first end and a second end;
    wherein the second support is further defined with a third end and a fourth end;
    wherein the third support is further defined with a fifth end and a sixth end;
    wherein the second end of the first support attaches to the first free end of the first superior face of the first blade in the manner of a cantilever;
    wherein the fourth end of the second support attaches to the second free end of the second superior face of the second blade;
    wherein the sixth end of the third support attaches to the pivot of the hedger in the manner of a cantilever.

2. The cutting implement according to claim 1 wherein the trap is mounted on the first superior face and the second superior face of the hedger.

3. The cutting implement according to claim 2
    wherein the trap captures and contains the clippings from a side;
    wherein the clippings are further supported from a bottom by the first superior face and the second superior face.

4. The cutting implement according to claim 3
    wherein the trap comprises a sheeting, a first channel, and a second channel;
    wherein the first channel and the second channel are formed on the sheeting.

5. The cutting implement according to claim 4
    wherein the sheeting is a flexible textile;
    wherein the sheeting is cut in a rectangular shape.

6. The cutting implement according to claim 5
    wherein the first channel is a tubular passage through which a support selected from the plurality of supports is inserted;
    wherein the second channel is a tubular passage through which a support selected from the plurality of supports is inserted.

7. The cutting implement according to claim 6 wherein the first channel is formed by folding a first edge of the sheeting back upon the sheeting to form a tube.

8. The cutting implement according to claim 7
    wherein the second channel is formed by folding a second edge of the sheeting back upon the sheeting to form a tube;
    wherein the second edge is the edge of the sheeting that is distal from the first channel.

9. The cutting implement according to claim 8
    wherein the first channel further comprises a first seam;
    wherein the first seam secures the first channel to the sheeting;
    wherein the second channel further comprises a second seam;
    wherein the second seam secures the second channel to the sheeting.

10. The cutting implement according to claim 9
    wherein the first support inserts through the first channel;
    wherein the second support inserts through the second channel;
    wherein the center of the sheeting is wrapped around the third support such that the third support is between the center of the sheeting and the free ends of the first blade and the second blade.

11. The cutting implement according to claim 10 wherein the sheeting forms a mesh.

12. The cutting implement according to claim 11
    wherein the first seam is a sewn seam;
    wherein the second seam is a sewn seam.

* * * * *